UNITED STATES PATENT OFFICE.

ALBERT CORNELL, OF PORTLAND, OREGON.

COMPOSITION OF MATTER TO BE USED IN PREPARING A BEVERAGE.

1,181,213.   Specification of Letters Patent.   Patented May 2, 1916.

No Drawing.   Application filed February 24, 1915. Serial No. 10,312.

*To all whom it may concern:*

Be it known that I, ALBERT CORNELL, a citizen of the United States, residing in the city of Portland, county of Multnomah, and State of Oregon, have invented a new and useful Composition of Matter to be Used in Preparing a Beverage, of which the following is a specification.

My invention relates to a composition of matter and more particularly to a beverage extract, which may be used in substantially the same way and as a substitute for coffee, and which possesses valuable nutritious properties, but which is free from the stimulating and other objectional effects of coffee.

The principal ingredient of my invention is peanuts, treated substantially as hereinafter set forth, and in which treatment I use other ingredients, preferably hop water to give flavor and to produce therein an aroma, which shall be pleasant and appetizing, and preferably molasses to give color thereto. I have found also that rye, prepared as hereinafter specified, may also be used therein with good results.

In preparing my composition, I take, for example, two pounds of shelled peanuts, soak them, remove the hulls, then boil them, after which they are dried, roasted and ground. I then take, for example, four ounces of hops and boil them in water, say two quarts, until they are boiled to pieces. I then drain off this water. When rye is used, I take, for example, one pound of rye, roast and grind it. I then take the ground rye and the hop water and a pound of molasses, and cook them together until it becomes substantially dry, after which I grind it and mix it with the two pounds of ground peanuts, and it is ready for use. If I do not use the rye, I take one-half of the ground peanuts, say one pound of peanuts, and cook them in the hop water with the molasses until dry. I then grind the cooked product and mix it with the other pound of the ground peanuts, and it is ready for use. The rye not only adds nutrition and flavor to the composition, but also increases the bulk thereof.

In treating the peanuts, I boil them to remove the oil therefrom, as an oily or greasy appearance on a cup of coffee, or coffee substitute, is objectionable to a great many people, but it will be understood that the boiling might be omitted in order to get the beneficial effects to be had from the small quantity of oil in the peanuts.

While my composition can be made in any of the ways above explained, I do not wish to limit myself, except as I may be limited by the hereto appended claims.

I claim:

1. A solid soluble extract for preparing beverages, comprising peanuts, roasted and ground, and cooked in hop water until dry, and then re-ground.

2. A solid soluble extract for preparing beverages, comprising peanuts, boiled, dried, roasted and ground, and cooked in hop water until dry, and then re-ground.

3. A solid soluble extract for preparing beverages, comprising peanuts, boiled, dried, roasted and ground, and cooked in hop water and molasses until dry, and then re-ground for use.

4. A composition of matter for use in preparing beverages consisting of peanuts and rye, roasted and ground, and cooked in hop water and molasses until dry, and then re-ground.

5. A composition of matter for use in preparing beverages comprising peanut kernels roasted and ground and cooked in hop water and molasses until dry and then re-ground and made ready for use.

6. A composition of matter for use in preparing beverages, consisting of peanuts, soaked, boiled, dried, roasted and ground, and rye, roasted and ground, said rye being cooked in hop water and molasses until dry, and then ground and mixed with the ground peanuts for use.

7. A composition of matter for use in preparing beverages, consisting of peanuts, soaked, boiled or steamed, dried, roasted and ground, and rye roasted and ground and then cooked in hop water and molasses until dry, and then ground and mixed with the ground peanuts.

8. A composition of matter for use in preparing beverages, consisting of peanuts, soaked, boiled, dried, roasted and ground, and rye, roasted and ground and then cooked in hop water and molasses until dry, and then ground and mixed one part of rye to two parts of ground peanuts, substantially as specified.

9. A beverage substitute for coffee comprising roasted peanuts treated with hop water, and molasses to give aroma and color.

Signed at Portland, Multnomah county, Oregon, this 17th day of February, 1915.

ALBERT CORNELL.

In presence of—
R. B. FRENCH,
I. M. GRIFFIN.